United States Patent

[11] 3,574,921

| [72] | Inventors | Harry J. Fiegel |
| | | Galveston; |
| | | Russell S. Thatcher, Dallas, Tex. |
| [21] | Appl. No. | 747,287 |
| [22] | Filed | July 24, 1968 |
| [45] | Patented | Apr. 13, 1971 |
| [73] | Assignee | Kelso Marine, Inc. |

[54] METHOD OF MANUFACTURING STRUCTURAL PANELS
9 Claims, 2 Drawing Figs.

[52] U.S. Cl.................................................... 29/457, 29/471.1, 29/471.3
[51] Int. Cl.................................................... B23p 19/04
[50] Field of Search.......................................... 29/471.1, 471.3, 457, 486, 180, 183, 190; 219/117 (HD)

[56] References Cited
UNITED STATES PATENTS

| 813,918 | 2/1906 | Schmitz............... | 29/183 |
| 1,858,512 | 5/1932 | Langenberg et al.......... | 29/190 |
| 2,327,265 | 8/1943 | Herr.......................... | 219/117(H.D.) |
| 2,881,304 | 4/1959 | Dobson et al................ | 219/117 (H.D.) |
| 2,949,667 | 8/1960 | Cameron et al. ............. | 29/471.3 |
| RE26,287 | 10/1967 | Wasilisin et al............... | 219/117(H.D.) |
| 3,387,356 | 6/1968 | Clark........................... | 29/486X |
| 3,474,521 | 10/1969 | Schwenn..................... | 29/471.3 |

Primary Examiner—John F. Campbell
Assistant Examiner—Richard Bernard Lazarus
Attorneys—Jack W. Hayden, Richard E. Bee ABSTRACT: A method of manufacturing structural panels. A plurality of rib members is placed in a side-by-side relationship on a plate member and the rib members are simultaneously welded to the plate member to form a structural panel. Two or more such structural panels are welded together to form a structural panel assembly.

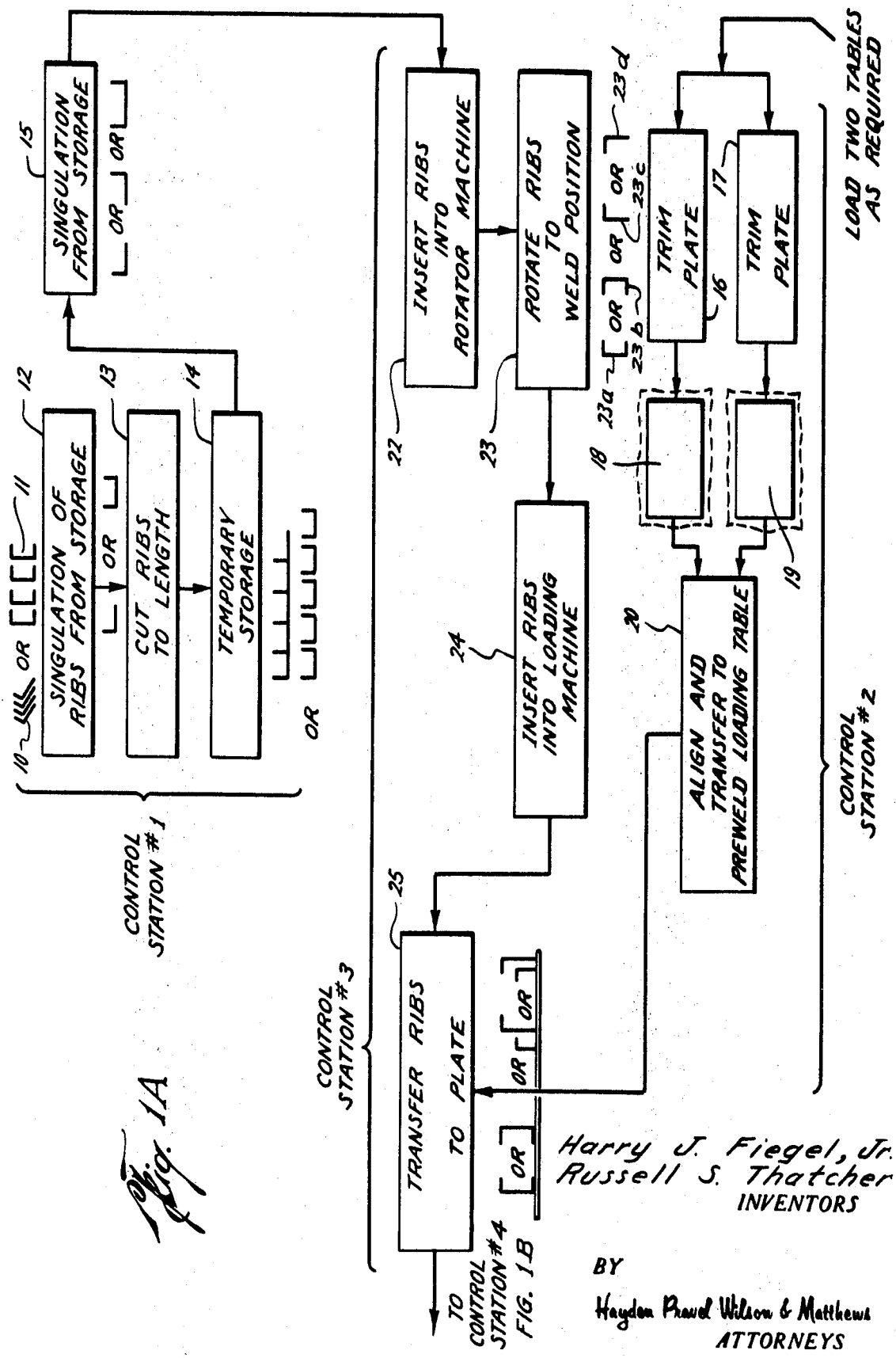

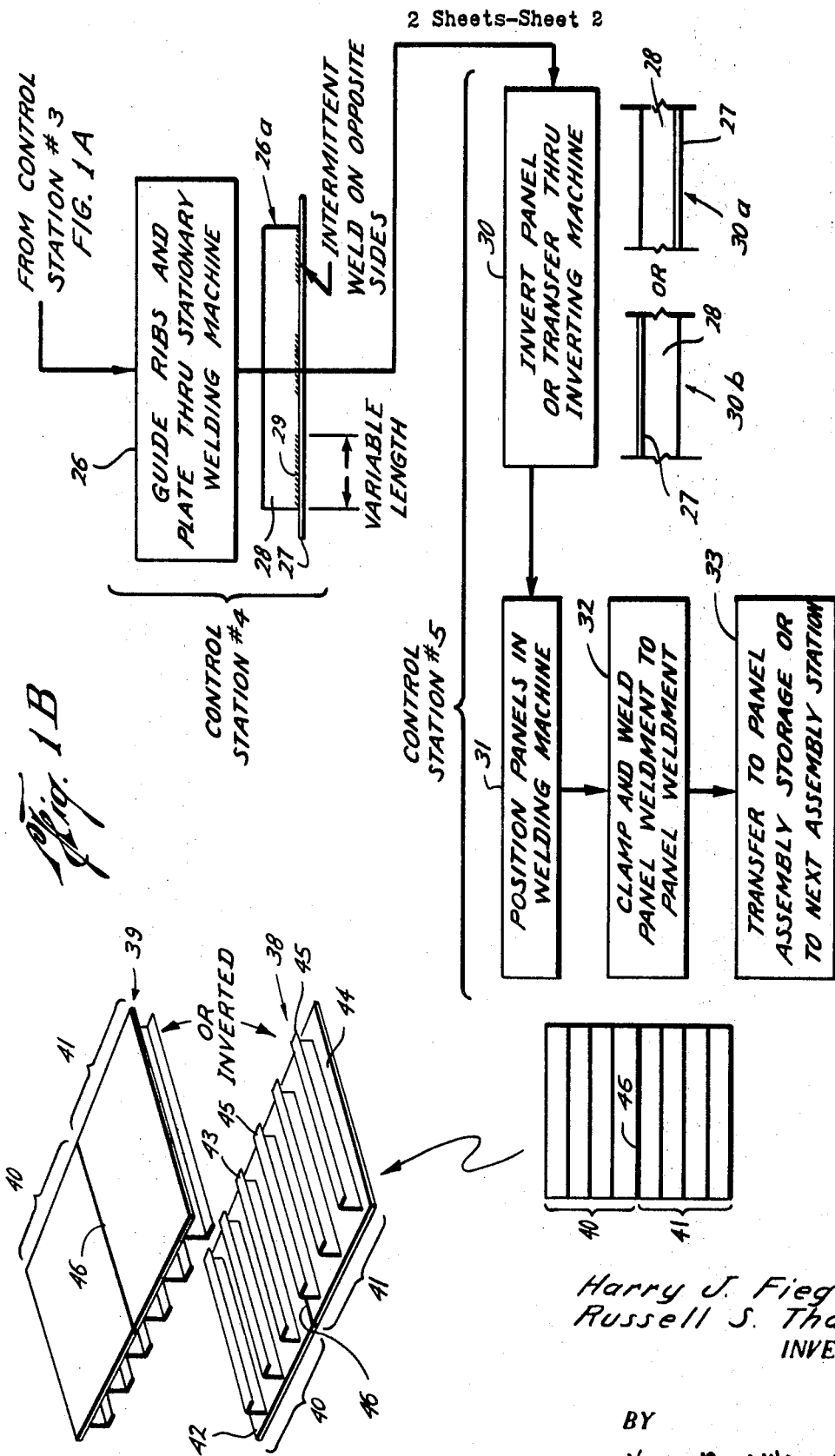

METHOD OF MANUFACTURING STRUCTURAL PANELS

BACKGROUND OF THE INVENTION

This invention relates to methods of manufacturing structural panels and to methods of manufacturing structural panel assemblies.

Various types of building structures, industrial structures, ships, boats, marine vessels and some types of land vehicles make use of structural steel plates having a series of structural steel reinforcing members attached thereto. Heretofore, such plate assemblies have usually been fabricated at the construction site with the reinforcing members being attached one at a time as the construction progresses. While such methods have accomplished the desired result, there is, nevertheless, considerable room for improvement in terms of getting the construction completed in a shorter period of time and in getting a greater amount of work done per man-hour of labor.

SUMMARY OF THE INVENTION

It is an object of the invention, therefore, to provide a new and improved method of manufacturing reinforced structural assemblies.

It is another object of the invention to provide a new and improved method of manufacturing prefabricated structural panels.

In accordance with one feature of the invention, a method of manufacturing structural panels includes placing a plurality of rib members in a side-by-side relationship on a plate member. The method also includes guiding the rib and plate members past a plurality of side-by-side welding devices. The method further includes simultaneously welding each of the rib members to the plate member to form a structural panel.

In accordance with another feature of the invention, a method is provided whereby the rib members are properly positioned on the plate members in a rapid and efficient manner. A further feature of the invention includes the provision of a method wherein two or more structural panels are formed and are then combined to form a more elaborate structural assembly.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIGS. 1A and 1B illustrate in a schematic manner a preferred embodiment of a method incorporating the various features of the present invention.

DESCRIPTION OF THE PREFERRED EMBODIMENT

The present invention relates to the manufacturing of structural panels and structural panel assemblies. While the methods of this invention can be performed by hand, or by hand operation of known mechanical devices and mechanisms, and while substantial advantages can be realized from such modes of operation, a primary feature of these methods is that they form the basis for a highly integrated and highly automated manufacturing operation which is of a very efficient and very practical nature. Consequently, in describing these methods reference will be made from time to time to various ways in which the different steps of the method may be automated.

One purpose of the present invention is to manufacture structural panels composed of metal material such as steel. Each panel comprises a metal plate having a series of elongated metal rib members welded thereto. The rib members will usually take the form of known types of structural shapes. Examples of structural shapes which may be used are: I-beams, T-beams, Z-beams, angles, channels and flat bars.

Another purpose of the invention is to manufacture structural panel assemblies. Such assemblies are formed by welding together two or more of the structural panels.

In describing the illustrated method, reference will be made from time to time to various "control stations." These control stations denote convenient groupings of the various steps of the overall method. It is envisioned that in a completed automated performance of the overall method, each control station might be under the supervision of but a single human operator.

Referring to FIG. 1A, there is shown a first control station, designated as Control Station No. 1, wherein there are performed the steps relating to the preliminary preparation of the rib members. For sake of an example, the method will be explained for the cases of angle beams and channel beams, it being understood that other types of structural shapes may instead be used. A supply of angle beams is indicated at 10, while a supply of channel beams is indicated at 11. As indicated at 12, the first step involves the singulation from storage of the rib members represented by either the angles 10 or channels 11. In this step, the rib members are removed one at a time from a storage rack and are placed end to end in a single file manner on a longitudinal conveyor system.

The singulated ribs are next cut to a predetermined length, as indicated at 13. This may be performed by means of a friction saw, the ribs being conveyed into the sawing machine one at a time and held in the proper position during the sawing operation. After being sawed to length, the ribs are placed in a side-by-side manner on a transverse conveyor system, such conveyor system providing a temporary storage as indicated at 14. The ribs are subsequently removed from the temporary storage 14 and are singulated in an end-to-end single-file manner, as indicated at 15. This singulation step 15 is performed by a further longitudinal conveyor system moving at right angles to the transverse conveyor system providing the temporary storage 14. The singulated and cut to length rib members appearing at the output of the singulation step 15 are then conveyed to the next control station.

At the same time that the foregoing operations are being performed, the plate members are also undergoing a preliminary preparation at a control station designated as Control Station No. 2. In particular, the plate members are individually loaded onto a pair of cutting tables used in connection with the steps indicated at 16 and 17. At this point, the plate members are trimmed to the desired size by means of oxygen-acetylene cutting torches. The trimmed plate members are indicated at 18 and 19, the edge portions which are trimmed away being indicated by dotted line. The trimmed plate members 18 and 19 then undergo an alignment step as indicated at 20. At stage 20, the plate members are aligned with the desired orientation and placed in a side-by-side manner ready for transfer to the next stage.

The cut and singulated rib members provided by Control Station No. 1 and the trimmed plate members provided by Control Station No. 2 are transferred on demand to a Control Station No. 3, which functions to position the rib members on the plate members. In particular, the singulated rib members from Control Station No. 1 are conveyed to and inserted into a rotator machine as indicated at 22. The rib members are then rotated to a predetermined angular orientation as indicated at 23. Usually, each rib member will be rotated to an upright position as indicated by the typical examples depicted at 23a—23d. In other words, for a structural shape having a flange portion, the shape will be rotated so that the web portion extends in a vertical direction, with the flange or flanges facing either to the right or to the left as desired. The rotated rib members are then conveyed to and inserted into a loading machine as indicated at stage 24. The loading machine holds the desired number of rib members in a parallel side-by-side spaced-apart relationship relative to one another.

While the loading machine is being loaded, a trimmed plate member is transferred to an assembly point indicated at 25. After being loaded, the loading machine is moved to the assembly point 25 at a position above the plate member. The loading machine is then lowered to place the side-by-side rib members on the top surface of the plate member.

There are two different ways in which the rotating and loading steps 22—24 may be performed. One way is to use a rotator machine capable of simultaneously holding the desired number of rib members. In this case, the rib members are simultaneously rotated to the desired weld position at stage 23. They are then simultaneously inserted into the loading machine at step 24. A second way is to use a rotator machine capable of holding only one rib member at a time. A rib member is inserted into the machine and rotated to the desired angular orientation. It is then inserted into one of the holding racks on the loading machine. This process is then repeated for additional individual rib members until the loading machine is completely loaded. The later technique is presently preferred for the case of an automated operation because the cost and complexity of the rotator machine is substantially reduced and yet the technique is sufficiently rapid so as to keep up with the rest of the steps in the overall process.

The rotator machine for the one-at-a-time technique may take the form of an elongated rib holding structure which is adapted to receive rib members from a conveyor system. The rib holding mechanism is adapted for rotation around its longitudinal axis. The rotator machine is also provided with a carriage mechanism whereby the rotating portion may be moved as a whole in a lateral direction for purposes of aligning such portion with one of the holding racks in the loading machine.

The loading machine which may be used at step 24 includes a plurality of elongated holding racks into which the rib members may be inserted in an endwise manner. The loading machine is provided with a carriage mechanism so that after the machine is properly loaded the loading rack as a whole may be moved to a position above the plate member at the assembly point 25. The loading machine is also provided with a raising and lowering mechanism whereby the loading racks as a group may be lowered to bring the rib members into engagement with the plate member.

Referring now to FIG. 1B, there are shown the subsequent steps in the overall method. In particular, the plate member with the rib members positioned thereon is transferred from the assembly point 25 of FIG. 1A to a Control Station No. 4 which is shown in FIG. 1B. At this control station, the plate and rib members are guided past a plurality of stationary side-by-side welding devices in a stationary welding machine as indicated at 26. The various rib members are simultaneously welded to the plate member during this passage past the stationary welding devices. The welding devices are of the arc welding type. The guiding of the plate and ribs past the welding devices is performed by a plurality of side-by-side sets of roller guides, there being one set for each rib member. The sets of guide rollers include suitable holddown rollers for urging the rib members firmly into engagement with the plate member during this guiding and welding process. Preferably, the holddown force on the rib members is on the order of 100,000 pounds or more.

A side view of a typical welded panel is indicated at 26a. The plate member is indicated at 27 and one of the rib members at 28. The welding seam is indicated at 29 and, as shown, it may be of an intermittent character.

When the completed structural panels emerge from the stationary welding machine of step 26, they are conveyed to a transfer machine indicated at stage 30, this being the first stage of a final control station designated as Control Station No. 5. The transfer machine of step 30 has two possible modes of operation. In one mode, the structural panel is simply transferred without change to the next stage. This is indicated by the pictoral representation at 30a, the plate 27 being shown on the bottom and the rib member 28 being shown on the top. In the second mode of operation, the transfer machine of step 30 operates to invert or "flip" the panel into an upside-down position. This is indicated by the pictoral representation at 30b wherein the plate member 27 is shown as being on top and the rib member 28 as being on the bottom.

The structural panels emerging from the transfer stage 30 are then conveyed to and positioned in a welding machine as indicated by step 31. A desired number of the structural panels, for example, two of them, is then clamped in an abutting position relative to one another and the abutting edges of such plate members are welded together, this being indicated at step 32. The completed panel assembly is then transferred, as indicated at step 33, to a panel assembly storage facility or to a further assembly station. If the completed structural panel assemblies are to be shipped to a different geographical location or are to be used at a later date, then they are simply stacked in a panel assembly storage area. If, on the other hand, further manufacturing operations are to be immediately conducted at the same location, then the completed structural panel assemblies are transferred to the next assembly station in the manufacturing operation.

A completed structural panel assembly is indicated in a noninverted position at 38 and in an inverted position at 39. The panel assembly includes a pair of structural panels 40 and 41. Panel 40 includes a plate member 42 and a series of parallel rib members 43. The panel 41 includes a plate member 44 and a series of parallel rib members 45. The plates of panels 40 and 41 are welded together in a butt-welded manner as indicated by a welding seam 46.

The method just described is intended for use in manufacturing large numbers of structural panels and structural panel assemblies. In such case, the various steps of the method are repeated over and over again in either a continuous manner or an intermittent manner until the desired number of panels or panel assemblies is produced. In this regard, earlier steps in the overall process are performed at the same time as are the later steps in the process, assuming, of course, that the process has been in operation long enough so that completed panel assemblies are emerging from the output stage of the last control station. Thus, for example, the cutting of the rib members and the trimming of the plate members continue to be carried out at the same time that previously cut rib members and previously trimmed plate members are being assembled at Control Station No. 3. Likewise, the positioning of the ribs and plate members at Control Station No. 3 is carried out at the same time that the previously assembled plate and rib combination is being welded together at Control Station No. 4. Likewise, all these previous operations continue to be carried out at the same time that the welding together of the individual panels is being performed at Control Station No. 5. Because of the novel sequence of operations and because of the fact that different ones of the operations are going on at the same time, the total manufacturing time is considerably reduced.

From the foregoing description of a preferred embodiment of the invention, it is seen that there is provided a novel method of manufacturing structural panels and structural panel assemblies. Such method reduces the overall manufacturing time and enables a greater number of panels or panel assemblies to be manufactured for a given expenditure of labor.

We claim:

1. A method of manufacturing structural metal panels comprising:
 a. supplying a plurality of individual structural metal rib members to a rotator machine;
 b. providing a supply of structural metal plate members;
 c. operating the rotator machine to rotate the rib members to a predetermined angular orientation corresponding to the final weld position;
 d. placing the rotated rib members in a spaced side-by-side relationship in a loading machine;

e. operating the loading machine to place the side-by-side rib members on one of the plate members; and f. holding the rib members in engagement against the plate member and simultaneously welding each of the rib members to the plate member to form a structural metal panel.

2. A method of manufacturing structural metal panel assemblies comprising:

a. supplying a plurality of individual structural metal rib members to a rotator machine;

b. providing a supply of structural metal plate members;

c. operating the rotator machine to rotate the rib members to a predetermined angular orientation corresponding to the final weld position;

d. placing the rotated rib members in a spaced side-by-side relationship in a loading machine;

e. operating the loading machine to place the side-by-side rib members on one of the plate members;

f. holding the rib members in engagement against the plate member and simultaneously welding each of the rib members to the plate member to form a first structural panel;

g. repeating steps (a) and (c) through (f) for a second plurality of rib members and a second plate member to form a second structural panel; and h. welding the two panels together to form a structural metal panel assembly.

3. A method of manufacturing structural metal panels comprising:

a. supplying a plurality of individual structural metal rib members to a rotator machine;

b. providing a supply of structural metal plate members;

c. operating the rotator machine to rotate the rib members to a predetermined angular orientation corresponding to the final weld position;

d. placing the rotated rib members in a spaced side-by-side relationship in a loading machine;

e. operating the loading machine to place the side-by-side members on one of the plate members;

f. simultaneously moving the rib and plate members in a continuous manner past a plurality of stationary side-by-side welding devices;

g. causing a plurality of guide rollers to engage such rib members during such movement for maintaining the proper positional and orientational relationships of the rib members on the plate member; and h. operating the welding devices to weld each of the rib members to the plate member as such members move past the welding devices to thereby form a structural metal panel.

4. A method of manufacturing structural metal panels in accordance with claim 3 and further including the steps of:

i. repeating steps (a) and (c) through (h) for additional pluralities of rib members and additional plates members to form a desired number of structural panels;

j. steps (a) and (c) through (e) being performed for one group of rib and plate members during the performance of steps (f) through (h) for another group of rib and plate members, thereby to enable the panels to be formed at a rapid rate.

5. A method of manufacturing structural metal panels in accordance with claim 3 wherein step (a) includes cutting the rib members to a predetermined length before supplying them to the rotator machine and step (b) includes cutting the plate members to a predetermined size.

6. A method of manufacturing structural metal panels comprising:

a. providing a supply of individual structural metal rib members;

b. cutting the rib members to a predetermined length;

c. providing a supply of structural metal plate members;

d. cutting the plate members to a predetermined size;

e. rotating the cut rib members to a predetermined angular orientation;

f. placing the rotated rib members in a spaced side-by-side relationship;

g. placing the side-by-side rib members on one of the cut plate members;

h. guiding the assembled rib and plate members past a plurality of side-by-side welding devices;

i. operating the welding devices to weld each of the rib members to the plate member as such members move past the welding devices to thereby form a structural metal panel;

j. repeating steps (e) through (i) for additional pluralities of rib members and additional plate members to form a desired number of structural panels; and k. steps (b) and (d) being performed during the performance of steps (e) through (j) and steps (e) through (g) being performed for one group of rib and plate members during the performance of steps (h) and (i) for another group of rib and plate members, thereby to enable the panels to be formed at a rapid rate.

7. A method of manufacturing structural metal panel assemblies comprising:

a. providing a supply of individual structural metal rib members;

b. providing a supply of structural metal plate members;

c. rotating the rib members to a predetermined angular orientation;

d. placing the rotated rib members in a spaced side-by-side relationship;

e. placing the side-by-side rib members on one of the plate members;

f. simultaneously moving the rib and plate members in a continuous manner past a plurality of stationary side-by-side welding devices, the rib members moving in a lengthwise manner;

g. causing a plurality of sets of guide rollers to individually engage different ones of the rib members during such movement for maintaining the proper positional and orientational relationships of the rib members on the plate member;

h. operating the welding devices to weld each of the rib members to the plate member as such members move past the welding devices to thereby form a first structural metal panel;

i. repeating steps (c) through (h) for a second plurality of rib members and a second plate member to form a second structural metal panel; and j. welding the two panels together to form a structural metal panel assembly.

8. A method of manufacturing structural metal panel assemblies in accordance with claim 7 wherein steps (c) through (e) are performed for the second set of rib and plate members during the performance of steps (f) through (h) for the first set of rib and plate members.

9. A method of manufacturing structural metal panel assemblies comprising:

a. providing a supply of individual elongated structural metal shapes;

b. cutting the structural shapes to a predetermined length;

c. providing a supply of structural metal plate members;

d. cutting the plate members to a predetermined size;

e. rotating the cut structural shapes to a predetermined angular orientation;

f. placing the rotated structural shapes in a spaced side-by-side relationship;

g. placing the side-by-side structural shapes on one of the cut plate members;

h. guiding the assembled shapes and plate member past a plurality of side-by-side welding devices, the shapes moving in a lengthwise manner and being held in engagement against the plate member;

i. operating the welding devices to weld each of the structural shapes to the plate member as such members move past the welding devices to form a structural panel;

j. repeating steps (e) through (i) for additional pluralities of structural shapes and additional plate members to form additional structural panels; and k. welding the structural panels together in groups of predetermined number to form a desired number of structural panel assemblies; and l. steps (b) and (d) being performed during the performance of steps (e) through (k), steps (e) through (g) being performed for one shapes and plate set during the performance of steps (h), (i) and (k) for other shapes and plate sets, and steps (h) and (i) being performed for one of the other shapes and plate sets during the performance of step (k) for other of the other shapes and plate sets, thereby to enable the assemblies to be formed at a rapid rate.